Patented Aug. 12, 1952

2,606,897

UNITED STATES PATENT OFFICE 2,606,897

POLYAZO DYESTUFFS

Philippe Grandjean, Basel, Switzerland, assignor to Sandoz, A. G., Basel, Switzerland, a Swiss firm No Drawing. Application August 14, 1951, Serial No. 241,895. In Switzerland August 17, 1950

6 Claims. (Cl. 260—167)

The present invention relates to polyazo dyestuffs.

The primary object of the present invention is the embodiment of a new group of polyazo dyestuffs characterized by diazotizability, good drawing capacity onto cotton and regenerated cellulose, and the property of yielding dyeings in a variety of shades of good fastness properties and dischargeability. This object is realized, according to this invention, by the group of dyestuffs which correspond to the formula

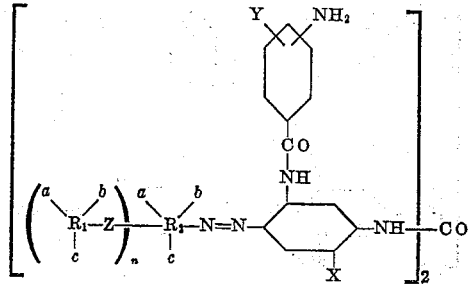

wherein $n$ is one of the integers 0 and 1, each of $R_1$ and $R_2$ stands for radicals of the benzene and naphthalene series, one $a$ stands for —$SO_3H$, the other $a$ and each of both $b$ and both $c$ stand for hydrogen and halogen atoms and lower alkyl-, lower alkoxy-, hydroxy-, COOH— and $SO_3H$-groups, Z stands for —NHCO— and —N=N—, X stands for hydrogen, lower alkyl or lower alkoxy, and Y stands for hydrogen, halogen, lower alkyl or lower alkoxy.

These new dyestuffs are obtained by the action of a reducing agent on a dyestuff of the formula

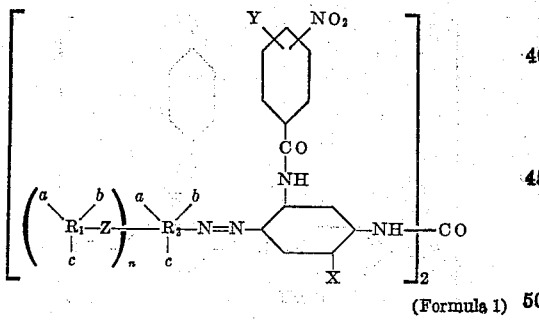

(Formula 1)

wherein $n$, $R_1$, $R_2$, $a$, $b$, $c$, Z, X and Y have the previously-indicated significances, whereby the —$NO_2$ group is converted to —$NH_2$.

The starting dyestuffs corresponding to Formula 1 (supra) may be prepared for example as follows:

(a) An amine of the formula

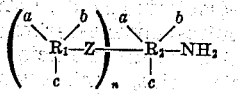

wherein $n$, $R_1$, $R_2$, $a$, $b$, $c$ and Z have the precedingly-recited significances is diazotized, the obtained diazo compound coupled with an amine of the formula

(Formula 2)

wherein Ac stands for an acyl group of the aliphatic series, such for example as a formyl, acetyl, oxalyl or urethane group, which is readily hydrolyzable in acid medium, and X has the previously-indicated significance, then the thus-produced p-aminoazo dyestuff treated with phosgene, the Ac group hydrolyzed in such manner—e. g. by the action of a dilute mineral acid while warming mildly—that the urea group is not attacked, and then the resultant o-aminoazo dyestuff condensed with a benzoic acid halide of the formula

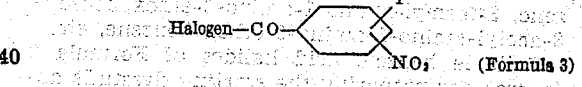

(Formula 3)

wherein Y has the previously-indicated significance.

(b) Alternatively, the starting dyestuff may be prepared by diazotizing an amine of the formula

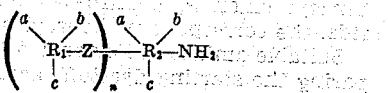

wherein $n$, $R_1$, $R_2$, $a$, $b$, $c$ and $Z$ have the precedingly-recited significances, coupling the obtained diazo compound in acid medium with an amine of the formula

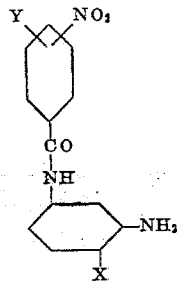

(Formula 4)

wherein X and Y have the aforeindicated significances, and treating the thus-prepared p-aminoazo dyestuff with phosgene.

Suitable amines of the formula

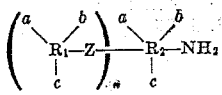

for use, according to the present invention in making the starting dyestuffs of the Formula 1 (supra), comprise aminobenzene-monosulfonic acids, aminobenzene-disulfonic acids, aminomethylbenzene sulfonic acids, amino-ethylbenzene sulfonic acids, amino-chlorobenzene sulfonic acids, amino-bromobenzene sulfonic acids, aminonaphthalene-monosulfonic acids, aminonaphthalene-disulfonic acids, aminobenzoylamino-hydroxy-sulfo-benzene-carboxylic acids, aminoazobenzene-monosulfonic acids, aminoazobenzene-disulfonic acids, aminoazomethylbenzene-monosulfonic acids, aminoazomethylbenzene-disulfonic acids, or aminoazo compounds obtained by coupling a diazotized aminobenzene sulfonic acid or aminonaphthalene sulfonic acid with an amine of the benzene or naphthalene series, such for example as aminobenzene, 1-amino-3-methylbenzene, 1-amino-3-ethylbenzene, 1-amino-2,5-dimethylbenzene, 1-amino-2-methoxy-5-methylbenzene, 1-amino-2,5-dimethoxybenzene, 1-amino-2,5-diethoxybenzene, 1-aminonaphthalene, 1-aminonaphthalene-6-sulfonic acid, 1-aminonaphthalene-7-sulfonic acid, etc.

Suitable amines of Formula 2 (supra) for use in preparing the starting dyestuffs according to method (a), supra, comprise 3-formyl-amino-1-aminobenzene, 3-acetyl-amino-1-aminobenzene, 3-oxalyl-amino-1-aminobenzene, 3-formyl-amino-1-amino-6-methylbenzene, 3-acetyl-amino-1-amino-6-methylbenzene, 3-oxalyl-amino-1-amino-6-methylbenzene, 3-formyl-amino-1-amino-6-methoxybenzene, 3-acetyl-amino-1-amino-6-methoxybenzene, 3-oxalyl-amino-1-amino-6-methoxybenzene, 3-formyl-amino-1-amino-6-ethylbenzene, 3-acetyl-amino-1-amino-6-ethylbenzene, 3-oxalyl-amino-1-amino-6-ethylbenzene, 3-formyl-amino-1-amino-6-ethoxybenzene, 3-acetyl-amino-1-amino-6-ethoxybenzene, etc.

Suitable benzoic acid halides of Formula 3 (supra) for preparing the starting dyestuffs according to method (a), supra, comprise 3-nitrobenzoyl chloride, 4-nitrobenzoyl chloride, 4-nitro-3-methylbenzoyl chloride, 4-nitro-3-ethylbenzoyl chloride, 3-nitro-4-methoxybenzoyl chloride, 3-nitro-4-ethoxybenzoyl chloride, 4-nitro-3-chlorobenzoyl chloride, 4-nitro-3-bromobenzoyl chloride, the corresponding benzoyl bromides, etc.

Suitable amines of Formula 4 (supra) for preparing the starting dyestuffs according to method (b), supra, comprise 3-(4'-nitrobenzoylamino)-1-aminobenzene, 3-(4'-nitrobenzoylamino)-1-amino-6-methylbenzene, 3-(4'-nitrobenzoylamino)-1-amino-6-methoxybenzene and corresponding compounds wherein the 4'-nitrobenzoylamino group is replaced by a 3'-nitrobenzoylamino group, a 3'-nitro-4'-methoxy-benzoylamino group, a 3'-nitro-4'-ethoxy-benzoylamino group, a 4'-nitro-3'-methylbenzoylamino group, a 4'-nitro-3'-ethylbenzoylamino group, a 4'-nitro-3'-chlorobenzoylamino group, a 4'-nitro-3'-bromobenzoylamino group, etc.

The conversion of the nitro group of the starting dyestuff of Formula 1, supra, into an amino group is effected by alkaline reduction with the aid of sodium sulfide or sodium polysulfide. This conversion converts the non-diazotizable substantive dyestuffs of Formula 1 into dyestuffs which draw onto cotton and regenerated cellulose and, diazotized on the fiber and for instance developed with 2-hydroxynaphthalene or a phenylmethylpyrazolone, yield yellow, orange, red, bordeaux-red and brown dyeings which are very fast to washing and to light and are of good dischargeability.

The following examples set forth representative exemplary embodiments of the invention, and these examples are intended to be solely illustrative and not at all limitative. In these examples, the parts and percentages are by weight, and the temperatures are expressed in degrees centigrade.

*Example 1*

50.4 parts of the sodium salt of the dyestuff of the formula

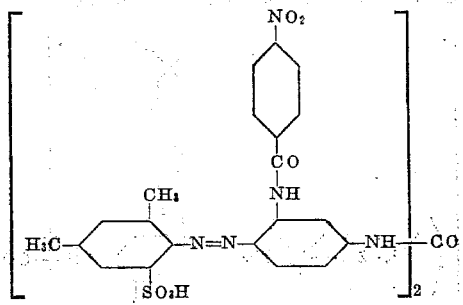

are dissolved in 1500 parts of water at 70°, and an aqueous solution of 12.5 parts of sodium sulfide are added to the resultant solution. The mixture is maintained at 70–75° for about 1 hour, and then the reduced dyestuff is salted out with sodium chloride, filtered off and washed. The dyestuff is a yellow powder, and dyes cotton and regenerated cellulose in yellow shades of good dischargeability. The resultant dyeings, after diazotization on the fiber and development with phenylmethylpyrazolone, is of very good fastness to washing. The dyestuff corresponds to the formula

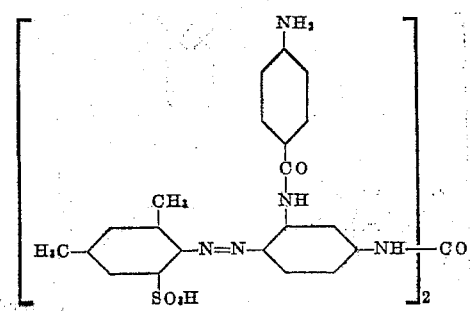

Dyestuffs with similar properties are obtained when, while otherwise proceeding as described in the preceding paragraph, use is made of starting dyestuffs wherein, on the one hand, the component derived from 1-amino-2,4-dimethylbenzene-6-sulfonic acid is replaced by an equivalent of a component derived from one of the following:

1-aminobenzene-2-sulfonic acid, or
1-aminobenzene-3-sulfonic acid, or
1-aminobenzene-4-sulfonic acid, or
1-amino-2-methylbenzene-4-sulfonic acid, or
1-amino-2-ethylbenzene-4-sulfonic acid, or
1-amino-2-ethylbenzene-5-sulfonic acid, or
1-amino-2-chlorobenzene-4-sulfonic acid, or
1-amino-2-bromobenzene-4-sulfonic acid, or
1-amino-2,4-dichlorobenzene-6-sulfonic acid, while, on the other hand, the 4-nitrobenzoyl moiety derived from the 4-nitrobenzoyl chloride is replaced by an equivalent of a corresponding moiety derived from one of the following:

3-nitrobenzoyl chloride, or
4-nitro-3-methylbenzoyl chloride, or
4-nitro-3-ethylbenzoyl chloride, or
3-nitro-4-methoxybenzoyl chloride, or
3-nitro-4-ethoxybenzoyl chloride, or
4-nitro-3-chlorobenzoyl chloride, or
4-nitro-3-bromobenzoyl chloride, or
A corresponding bromide.

The formula of a representative alternative dyestuff thus producible is, for instance:

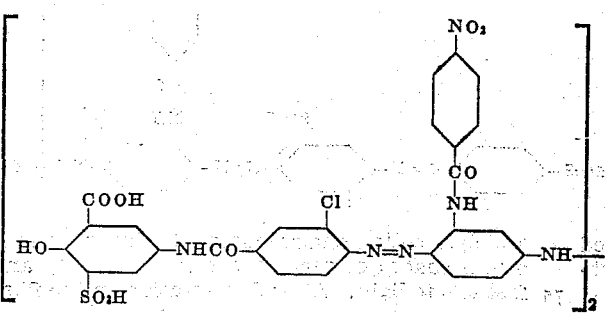

Example 2

69.0 parts of the sodium salt of the dyestuff of the formula

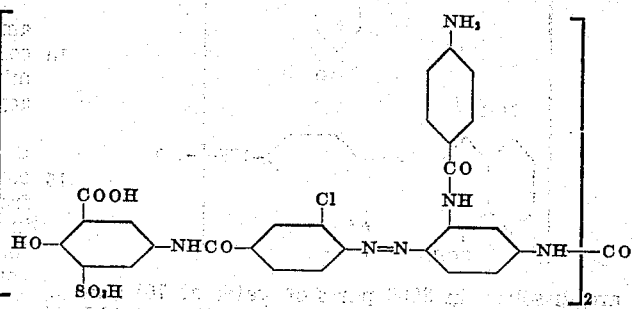

are dissolved in 2000 parts of water at 80° and then admixed with an aqueous solution of 18 parts of sodium tetrasulfide. The mixture is stirred for about 1 hour at 80°, the reduced dyestuff salted out with sodium chloride, filtered off and dried. The new dyestuff thus obtained is a yellow powder, which corresponds to the formula and dyes cotton and regenerated cellulose in yellow shades of good dischargeability. After diazotization on the fiber and development with phenylmethylpyrazolone, the resultant dyeings are characterized by very good fastness to washing. By development with 2-hydroxynaphthalene, orange colored dyeings with the same properties are obtained.

Dyestuffs with similar properties are obtained when, while otherwise proceeding as described in the preceding paragraph, use is made of starting dyestuffs wherein, on the one hand, the moiety derived from 4-(4'-amino-3'-chloro-benzoylamino)-1-hydroxy-6-sulfo-benzene-2-carboxylic acid is replaced by an equivalent of the corresponding moiety derived from 4-(3'-aminobenzoylamino)-1-hydroxy-6-sulfobenzene-2-carboxylic acid or from 6-(4'-amino-benzoylamino)-1-hydroxy-4-sulfo-benzene-2-carboxylic acid, while, on the other hand, the 4-nitrobenzoyl moiety derived from the 4-nitrobenzoyl chloride is replaced by an equivalent of a corresponding moiety derived from one of the nitrobenzoyl halides enumerated in the second paragraph of Example 1. The formula of a representative alternative dyestuff thus producible is, for instance:

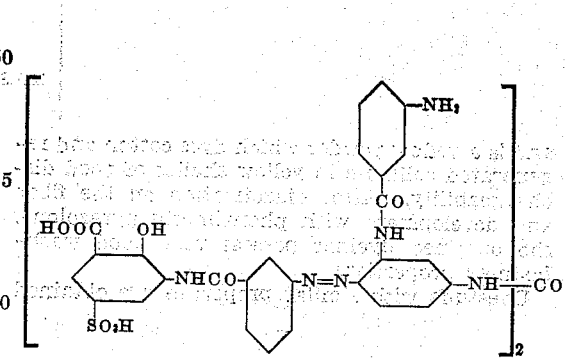

Example 3

62.8 parts of the tetrasodium salt of the dyestuff of the formula

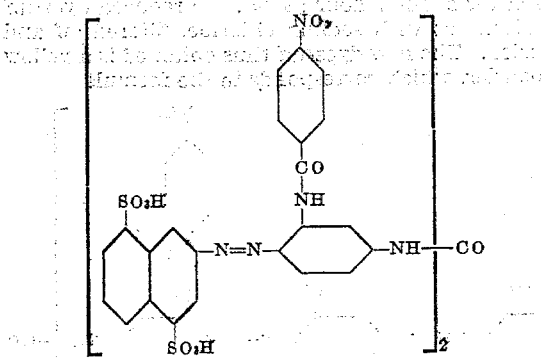

are dissolved in 2000 parts of water at 70° and then admixed with an aqueous solution of 12.5 parts of sodium sulfide. The mixture is stirred for about 1 hour at 70–75°, and the produced reduced dyestuff then salted out with sodium chloride, filtered off and dried. The new dyestuff thus obtained corresponds to the formula

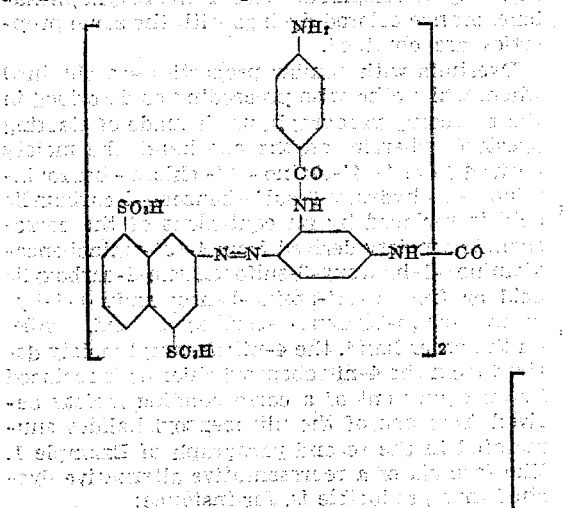

and is a yellow powder which dyes cotton and regenerated cellulose in yellow shades of good dischargeability. After diazotization on the fiber and development with phenylmethylpyrazolone, the obtained dyeings possess very good wash-fastness properties.

Dyestuffs with similar properties are obtained when, while otherwise proceeding as described in the foregoing paragraph, use is made of starting dyestuffs wherein:

(a) The moiety derived from 2-aminonaphthalene-4,8-disulfonic acid is replaced by an equivalent of the corresponding moiety derived from 2-aminonaphthalene-6,8-disulfonic acid or from 2-aminonaphthalene-5,7-disulfonic acid or from 2-aminonaphthalene-5-sulfonic acid or from 2-aminonaphthalene-8-sulfonic acid;

(b) The moiety derived from 3-acylamino-1-aminobenzene is replaced by an equivalent of the corresponding moiety derived from a 3-acylamino-1-amino-6-methylbenzene or from a 3-acylamino-1-amino-6-ethylbenzene; and (c) The 4-nitrobenzoyl moiety derived from the 4-nitrobenzoyl chloride is replaced by an equivalent of a corresponding moiety derived from one of the nitrobenzoyl halides enumerated in the second paragraph of Example 1. The formula of a representative alternative dyestuff thus producible is, for instance:

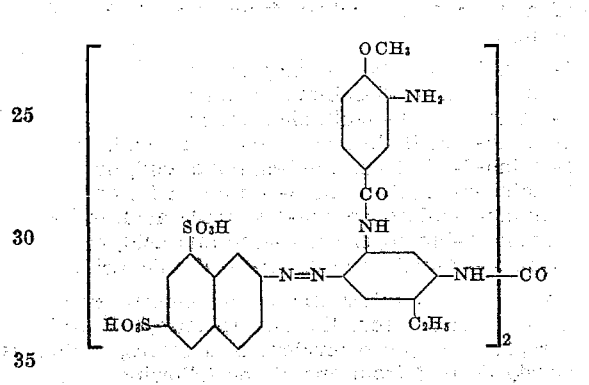

Example 4

69.6 parts of the tetrasodium salt of the dyestuff of the formula

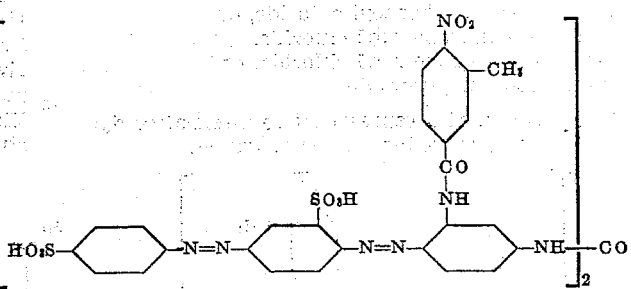

are dissolved in 1500 parts of water at 90° and then admixed with an aqueous solution of 11.5 parts of sodium disulfide. The mixture is stirred for about ½ hour, and the resultant reduced dyestuff salted out with sodium chloride, filtered off and dried. The new dyestuff, obtained as a dark-brown powder, corresponds to the formula

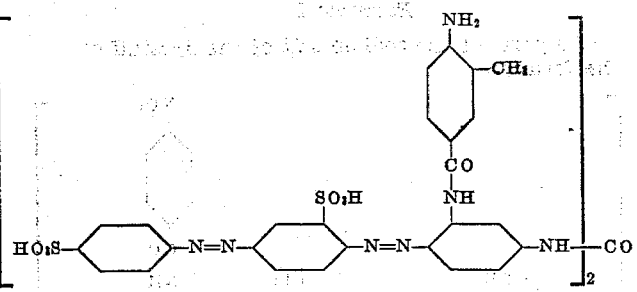

and dyes cotton and regenerated cellulose in red-brown shades of very good dischargeability and fastness to light. After diazotization on the fiber and development with 2-hydroxynaphthalene, the dyeings are characterized by very good fastness to washing.

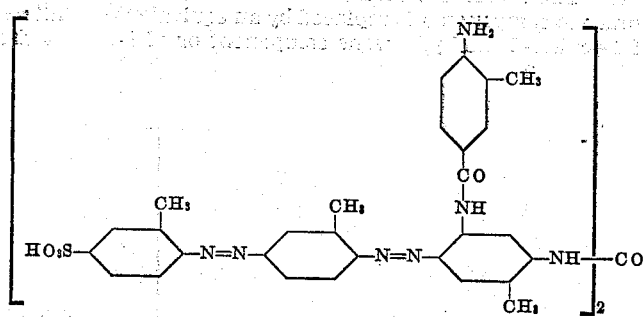

Dyestuffs with similar properties are obtained when, while otherwise proceeding as described in the foregoing paragraph, use is made of starting dyestuffs wherein:

(a) The moiety derived from 4-amino-1,1'-azozene-3,4'-disulfonic acid is replaced by an equivalent of the corresponding moiety derived from 4-amino-1,1'-azobenzene-4'-sulfonic acid or from 4 - amino - 2',3 - dimethyl - 1,1' - azobenzene - 4'-sulfonic acid or from the aminoazo compound from diazotized 1-aminobenzene-4-sulfonic acid and 1-aminonaphthalene-6-sulfonic acid or 1-aminonaphthalene-7-sulfonic acid;

(b) The moiety derived from 3-acylamino-1-aminobenzene is replaced by an equivalent of the corresponding moiety derived from a 3-acyl-amino-1-amino-6-methylbenzene or from a 3-acylamino-6-methoxybenzene; and (c) The 4-nitro-3-methylbenzoyl moiety is replaced by an equivalent of a corresponding moiety derived from one of the nitrobenzoyl halides enumerated in the second paragraph of Example 1. The formula of a representative alternative dyestuff thus producible is, for instance:

Example 5

74.6 parts of the tetrasodium salt of the dyestuff of the formula

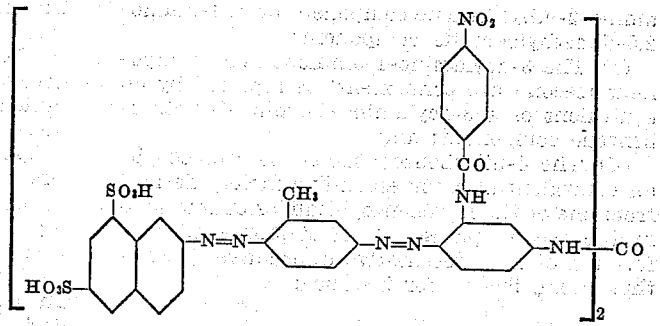

are dissolved in 2000 parts of water at 70° and then an aqueous solution of 12.5 parts of sodium sulfide is added. The mixture is stirred for about 1 hour at 70–75°, whereupon the resultant reduced dyestuff is salted out with sodium chloride, filtered off and dried. It corresponds to the formula

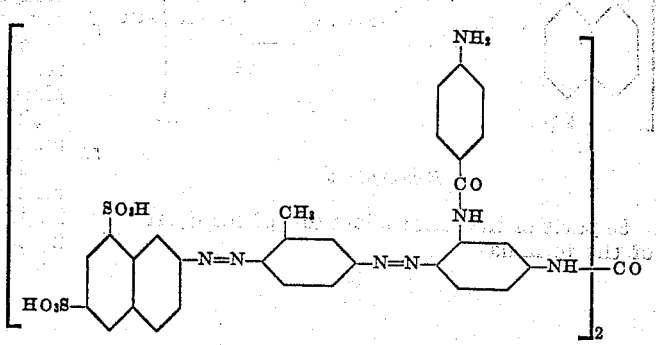

The new dyestuff is a brown powder; it dyes cotton and regenerated cellulose in brown shades of good dischargeability. After diazotization on the fiber and development with 2-hydroxynaphthalene, the resultant dyeings possess very good fastness to washing.

Dyestuffs with similar properties are obtained when, while otherwise proceeding as described in the foregoing paragraph, use is made of starting dyestuffs wherein:

(a) The moiety derived from 2-aminonaphthalene-6,8-disulfonic acid is replaced by an equivalent of the corresponding moiety derived form 2-aminonaphthalene-4,8-disulfonic acid or from 2-aminonaphthalene-5,7-disulfonic acid;

(b) The 1-amino-3-methylbenzene component (first azo component) is replaced by an equivalent of 1-amino-2-methylbenzene component or of 1-amino-2-ethylbenzene component or of 1-amino-2,5-dimethylbenzene component;

(c) The 3-acylamino-1-aminobenzene component (second azo component) is replaced by an equivalent of a 3-acylamino-1-amino-6-methylbenzene component; and (d) The 4-nitrobenzoyl moiety is replaced by an equivalent of a corresponding moiety derived from one of the nitrobenzoyl halides enumerated in the second paragraph of Example 1. The formula of a representative alternative dyestuff thus producible is, for instance:

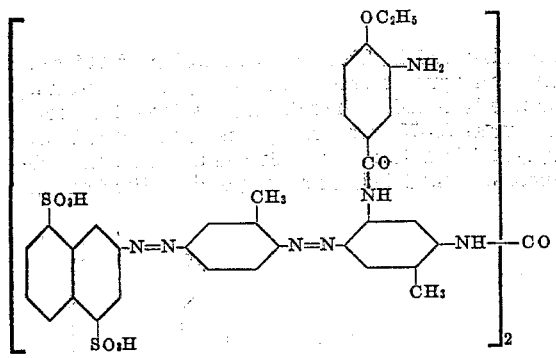

*Example 6*

80 parts of the tetrasodium salt of the dyestuff of the formula

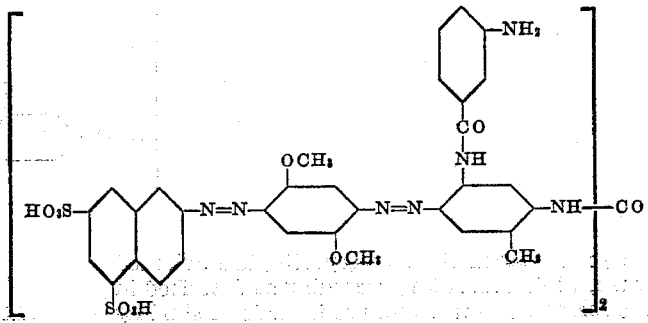

are dissolved in 2500 parts of water at 70°, after which an aqueous solution of 12.5 parts of sodium sulfide is added, the mixture stirred for 1 hour at 70–75°, and the formed reduced dyestuff thereupon salted out with sodium chloride, filtered off and dried. The product corresponds to the formula The new dyestuff is a brown powder; it dyes cotton and regenerated cellulose in violet-brown shades. After diazotization on the fiber and development with 2-hydroxynaphthalene, the obtained dyeings are of very good fastness to washing.

Dyestuffs with similar properties are obtained when, while otherwise proceeding as described in the foregoing paragraph, use is made of starting dyestuffs wherein:

(a) The component derived from 2-aminonaphthalene-5,7-disulfonic acid is replaced by an equivalent of a corresponding component derived from 2-aminonaphthalene-4,8-disulfonic acid or from 2-aminonaphthalene-6,8-disulfonic acid;

(b) The 1-amino-2,5-dimethoxybenzene component (first azo component) is replaced by an equivalent of 1-amino-2,5-diethoxybenzene component or of 1-amino-2-methoxybenzene component or of 1-amino-3-methoxybenzene component or of 1-amino-2-methoxy-5-methylbenzene component or of 1-amino-2-ethoxy-5-methylbenzene component;

(c) The 3-acylamino-1-amino-6-methylbenzene component (second azo component) is replaced by an equivalent of a 3-acylamino-1-aminobenzene component or of a 3-acylamino-1-amino-6-methoxybenzene component; and (d) The 3-nitrobenzoyl moiety is replaced by an equivalent of a corresponding moiety derived from one of the nitrobenzoyl halides enumerated in the second paragraph of Example 1. The

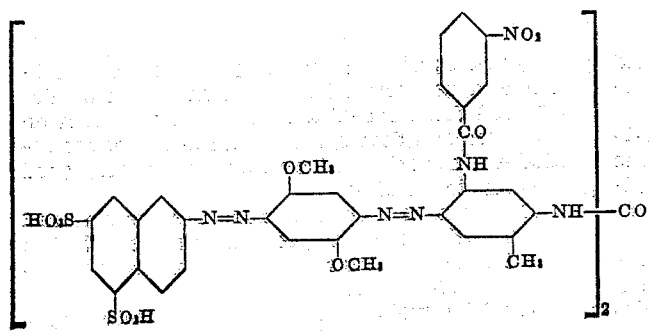

formula of a representative alternative dyestuff thus producible is, for instance:

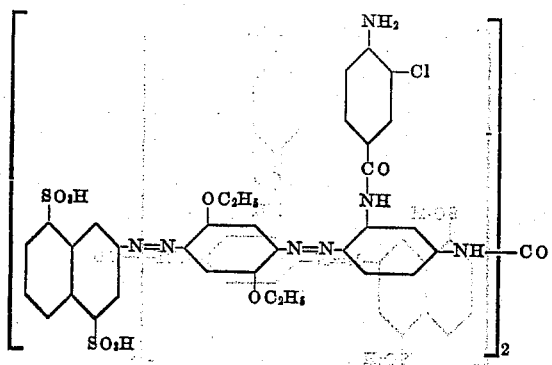

*Example 7*

68.8 parts of the tetrasodium salt of the dyestuff of the formula

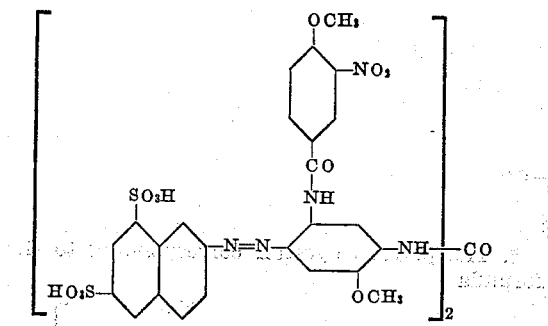

are dissolved in 2000 parts of water at 70° and then admixed with an aqueous solution of 12.5 parts of sodium sulfide. The mixture is stirred for about 1 hour at 70–75°, and the formed reduced dyestuff is then salted out with sodium chloride, filtered off and dried. It corresponds to the formula

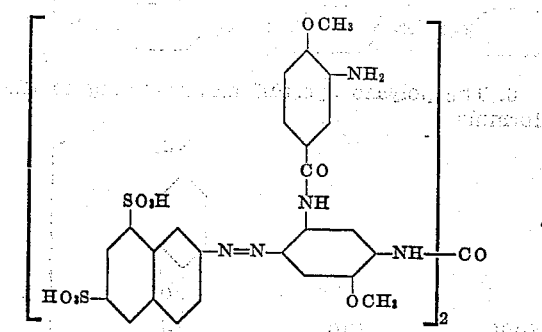

The new dyestuff is a dark powder; it dyes cotton and regenerated cellulose in orange shades of good dischargeability. After diazotization on the fiber and development with 2-hydroxynaphthalene, the obtained dyeings are of very good wash fastnes.

Dyestuffs with similar properties are obtained when, while otherwise proceeding as described in the foregoing paragraph, use is made of starting dyestuffs wherein:

(a) The component derived from 2-aminonaphthalene-6,8-disulfonic acid is replaced by an equivalent of a corresponding component derived from 2-aminonaphthalene-4,8-disulfonic acid or from 2-aminonaphthalene-5,7-disulfonic acid;

(b) The 3 - acylamino - 1 - amino - 6 - methoxybenzene component is replaced by an equivalent of a 3-acylamino-1-amino-6-ethoxybenzene component; and (c) The 3 - nitro - 4 - methoxybenzoyl moiety is replaced by an equivalent of a corresponding moiety derived from one of the nitrobenzoyl halides enumerated in the second paragraph of Example 1. The formula of a representative alternative dyestuff thus producible is, for instance:

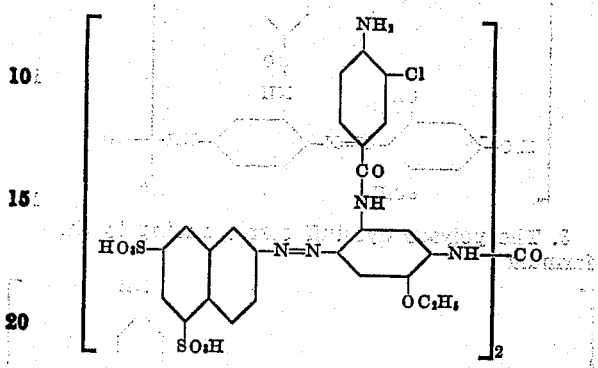

*Example 8*

100 parts of cotton are entered at 80° into a dyebath which contains 1 part of calcined sodium carbonate and 0.5 part of the dyestuff according to Example 3 (first paragraph) dissolved in 2000 parts of water. The dyebath is slowly heated to boiling, 20 parts of calcined Glauber's salt added and then allowed to cool to about 70°.

The dyed material is well rinsed with water and then treated for ½ hour in a cold bath with 2 parts of sodium nitrite and 5 parts of hydrochloric acid (30%). After rinsing with cold water, the material is entered into a cold development bath which contains 1 part of 1-phenyl-3-methyl-5-pyrazolone and 0.5 part of calcined sodium carbonate. The material is treated in this bath for ½ hour and then thoroughly rinsed.

The thus-obtained yellow dyeing is of very good fastness to washing and to light and of excellent dischargeability.

Having thus disclosed the invention what is claimed is:

1. A polyazo dyestuff which corresponds to the formula

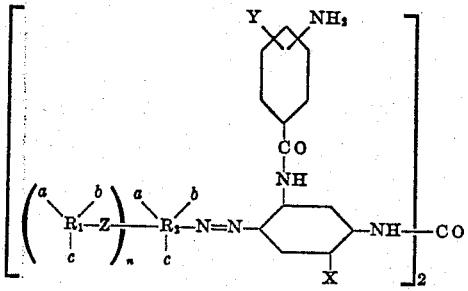

wherein $n$ is one of the integers 0 and 1, each of $R_1$ and $R_2$ stands for a member selected from the group consisting of radicals of the benzene and naphthalene series, one $a$ stands for —$SO_3H$, the other $a$ and each of both $b$ and both $c$ stand for members selected from the group consisting of hydrogen and halogen atoms and lower alkyl-, lower alkoxy-, hydroxy-, COOH— and $SO_3H$- groups, Z stands for a member selected from the group consisting of —NHCO— and —N=N—, X stands for a member selected from the group consisting of hydrogen, lower alkyl and lower alkoxy, and Y stands for a member selected from the group consisting of hydrogen, halogen, lower alkyl and lower alkoxy.

2. The polyazo dyestuff corresponding to the formula

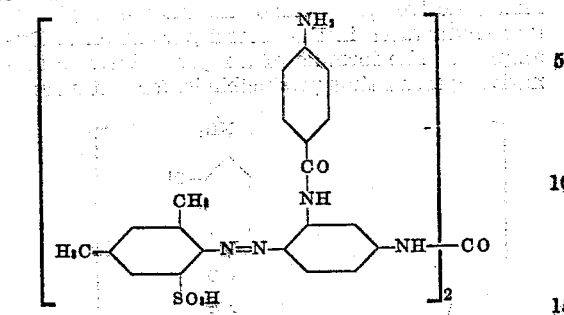

3. The polyazo dyestuff corresponding to the formula

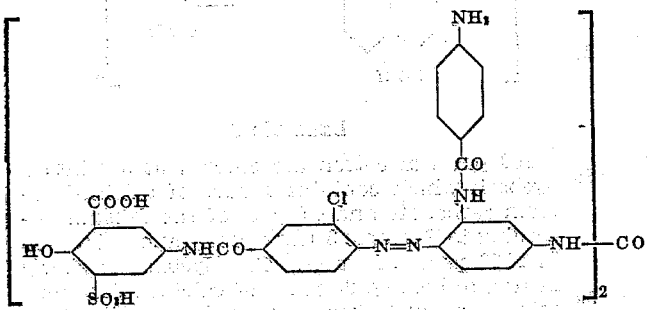

4. The polyazo dyestuff corresponding to the formula

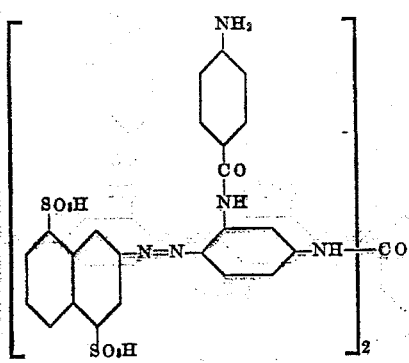

5. The polyazo dyestuff corresponding to the formula

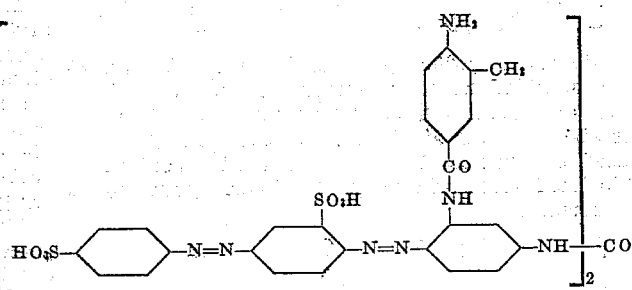

6. The polyazo dyestuff corresponding to the formula

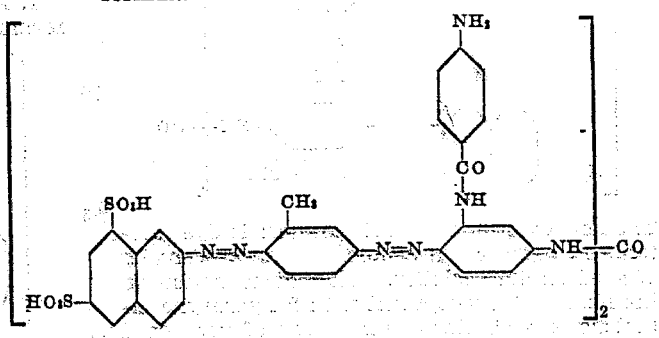

PHILIPPE GRANDJEAN.

REFERENCES CITED

The following references are of record in the file of this patent:

UNITED STATES PATENTS

| Number | Name | Date |
|---|---|---|
| 2,157,876 | Winkeler et al. | May 9, 1939 |
| 2,584,935 | Strobel et al. | Feb. 5, 1952 |